United States Patent [19]
Yamada

[11] Patent Number: 5,943,440
[45] Date of Patent: *Aug. 24, 1999

[54] METHOD FOR SEGMENTING JOINED CHARACTER PATTERNS FOR USE IN A CHARACTER RECOGNITION SYSTEM

[75] Inventor: Keiji Yamada, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/602,319

[22] Filed: Feb. 16, 1996

[30] Foreign Application Priority Data

Feb. 24, 1995 [JP] Japan .................................. 7-062030

[51] Int. Cl.⁶ .................................................. G06K 9/34
[52] U.S. Cl. .......................................... 382/178; 382/179
[58] Field of Search .................................... 382/174, 177, 382/178, 179, 194, 171, 199, 200, 286

[56] References Cited

U.S. PATENT DOCUMENTS

| | | | |
|---|---|---|---|
| 4,024,500 | 5/1977 | Herbst et al. | 382/178 |
| 4,365,234 | 12/1982 | Henrichon, Jr. | 382/178 |
| 4,379,282 | 4/1983 | Bailey | 382/178 |
| 4,654,873 | 3/1987 | Fujisawa et al. | 382/178 |
| 4,680,803 | 7/1987 | Dilella | 382/178 |
| 4,850,025 | 7/1989 | Abe | 382/177 |
| 5,033,098 | 7/1991 | Tanaka et al. | 382/171 |
| 5,046,114 | 9/1991 | Zobel | 382/171 |
| 5,054,091 | 10/1991 | Tanaka et al. | 382/177 |
| 5,307,422 | 4/1994 | Wang | 382/177 |
| 5,535,287 | 7/1996 | Niki | 382/178 |
| 5,680,479 | 10/1997 | Wang et al. | 382/178 |
| 5,684,891 | 11/1997 | Tanaka et al. | 382/178 |
| 5,778,103 | 7/1998 | Allan et al. | 382/173 |

FOREIGN PATENT DOCUMENTS

| | | | |
|---|---|---|---|
| 551738A2 | 7/1993 | European Pat. Off. | G06K 9/40 |
| 59-786 | 1/1984 | Japan | G06K 9/36 |
| 59-98283 | 6/1984 | Japan | G06K 9/00 |
| 63-158677 | 7/1988 | Japan | G06K 9/20 |
| 63-298493 | 12/1988 | Japan | G06K 9/34 |
| 01121988 | 5/1989 | Japan | G06K 9/34 |
| 1-121988 | 5/1989 | Japan | G06K 9/34 |

*Primary Examiner*—Amelia Au
*Assistant Examiner*—Timothy M. Johnson
*Attorney, Agent, or Firm*—Foley & Lardner

[57] ABSTRACT

In order to divide a dot pattern of touching characters having a thickness into patterns of each character without deformation, it is analyzed in the invention, as an ensemble of run continuations non-branched, continuations of neighboring 'run's, a succession of black dots ranged in a column being defined as a run. Some peculiar 'run's are nominated as segmentation candidates for dividing the dot pattern thereby, and the dot pattern of touching characters is divided by most appropriate one of the segmentation candidates.

15 Claims, 7 Drawing Sheets

METHOD FOR SEGMENTING JOINED CHARACTER PATTERNS FOR USE IN A CHARACTER RECOGNITION SYSTEM

BACKGROUND OF THE INVENTION

This invention relates to a character pattern segmentation system applied for character recognition of adjacent or touching handwritten character patterns.

The character pattern segmentation system is used in character recognition systems as an optical character reader for dividing touching character patterns into patterns of individual characters to be discriminated by a pattern recognizer when an input character pattern is found to be glued to another.

In a character pattern segmentation method disclosed in a Japanese patent application laid open as a Provisional Publication No. 121988/'89, a touching point of characters is detected by analyzing nodes of line segments which are obtained by abstracting and approximating ordinary dot pattern data into stroke data with no thickness, where nodes mean branching points of the abstracted line segments. The node analysis is performed for a collection of line segments, from which a farthest line segment is taken away one by one, from right hand, until a character is recognized uniquely.

In a Japanese patent application laid open as a Provisional Publication No. 98283/'84, there is disclosed a method of character segmentation and recognition, wherein an input touching character pattern is analyzed and classified to one of touching character combinations referring to a prepared list of patterns of various touching character combinations.

The character pattern segmentation method by node analysis described may involve unnecessary noise element as a lack of a line segment of a character data, because a dot pattern with a thickness to be divided into parts of two patterns may be abstracted into only a stroke line and sorted into either pattern.

The method of character segmentation and recognition in the Provisional Publication No. 98283/'94 needs no such pattern dividing but an enormous memory and a laborious work for preparing a reference list covering all patterns of touching character combinations.

SUMMARY OF THE INVENTION

Therefore, a primary object of the present invention is to provide a character pattern segmentation system wherein a dot pattern of touching characters with a thickness is properly divided into dot patterns of each character without unnecessary noise or use of an enormous memory.

In order to achieve the object, a character pattern segmentation system of the present invention comprises:

an image memory for storing bit map data of a pattern of touching characters composed of columns perpendicular to a row of said touching characters;

a run continuation detector including, a run detecting means for reading out data of a column of said pattern stored in said image memory sequentially from an end to another end of said pattern and outputting data of each run found in said column, a succession of black pixels in a column being called a run, a run register for storing data of said each run found in said column, preceding connection detecting means for detecting and outputting data of each of a run in said column touched with more than one run in a preceding column of said column, more than one run in said column touched with a same run in said preceding column, and a run in said column touched with no run in said preceding column as run data of a beginning run of each run continuation, and outputting data of each of said more than one run and said same run in said preceding column as run data of an ending run of each run continuation, run continuation end detecting means for detecting and outputting data of a run in said preceding column touching no run in said column as run data of an ending run of a run continuation, and outputting data of a run still rest undetected in said preceding column as run data of an intermediate run of a run continuation, and a run continuation register for storing run data which are output from said preceding connection detecting means and said run continuation end detecting means, and sorted into ensembles of run data of each run continuation;

a peculiar run detector for nominating and outputting certain of run data registered in said run continuation register and having certain peculiarity as segmentation candidates;

a segmentation candidate register for storing said segmentation candidates nominated and output from said peculiar run detector;

a segmentation designator for designating a final segmentation candidate most appropriate to divide said pattern of touching characters thereby among said segmentation candidates stored in said segmentation candidate register referring to position of each of said segmentation candidates relative to said pattern of touching characters and widths of patterns divided off by each of said segmentation candidates from said pattern of touching character; and a character pattern segregator for dividing said pattern of touching characters into two continuities of black pixels by deleting therefrom black pixels of a segmentation candidate designated by said segmentation designator and reporting widths of said two continuities to said segmentation designator, and, when said segmentation candidate designated is said final segmentation candidate, outputting bit map data of narrower one of said two continuity as bit map data of corresponding one of said touching characters and bit map data of another of said two continuity as bit map data of rest of said touching characters, said rest being final one of said touching characters in case number of said touching characters is two and otherwise bit map data of said rest being restored in said image memory.

So, by repeating processes described, a dot pattern of touching characters with a thickness can be properly divided into dot patterns of each character without unnecessary noise nor enormous memory.

Furthermore, the character pattern segmentation system of the invention comprises:

a white closed area detector for detecting a white closed area of said pattern of touching characters; and a second peculiar run detector for nominating and outputting data of a run touching a top point of said white closed area from run data stored in said run continuation register and a run touching a top edge of said white closed area from run data stored in said segmentation candidate register as data of upper segmentation candidates, and nominating and outputting data of a run touching a bottom point of said white closed area from run data stored in said run continuation register and a run touching a bottom edge of said white closed area from run data stored in said segmentation candidate register as data of lower segmentation candidates, when said final segmentation candidate can not be designated.

So, even when a character pattern includes pattern of characters touching at two points, it can be properly divided into patterns of each character without unnecessary noise nor enormous memory by selecting an appropriate combination of an upper and a lower segmentation candidates in the invention.

BRIEF DESCRIPTION OF THE DRAWINGS

The foregoing, further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Now, embodiments of the present invention will be described in connection with the drawings.

Figure 1:
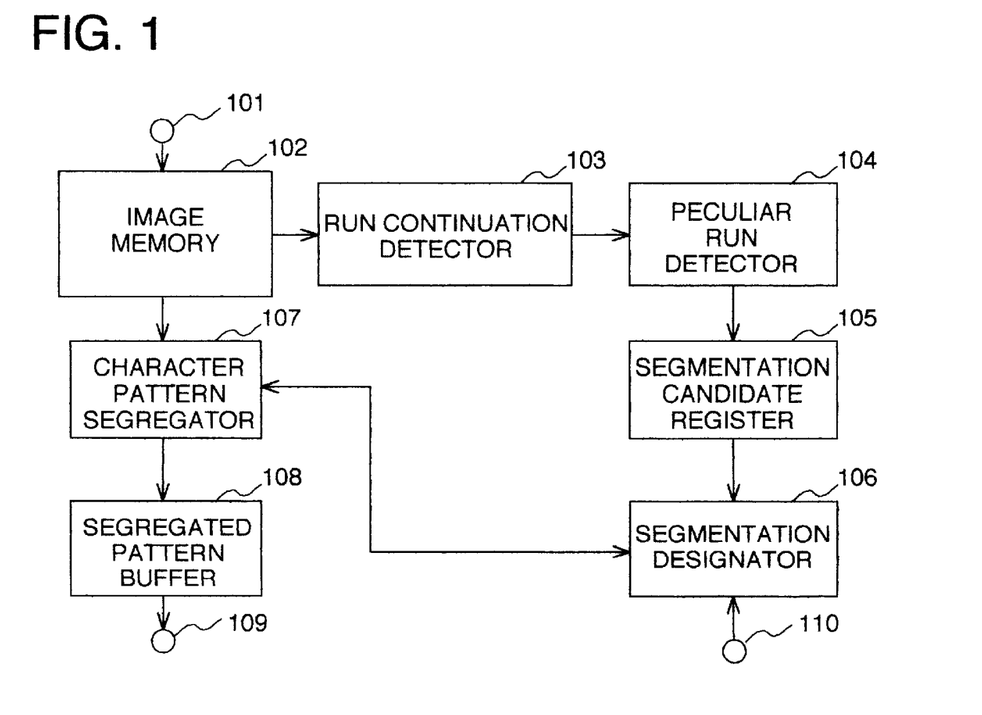
FIG. 1 is a block diagram of an embodiment of the present invention.

FIG. 1 is a block diagram of an embodiment of the invention, comprising an image memory 102, a run continuation detector 103, a peculiar run detector 104, a segmentation candidate register 105, a segmentation designator 106, a character pattern segregator 107 and a segregated pattern buffer 108.

Data of a black dot pattern of touching characters input from an input port 101 are stored and developed on a bit map in the image memory 102, which are read out column by column from left hand to right hand to be supplied to the run continuation detector 103 when the data are to be verified from left hand to right hand. Although they are to be read out and supplied to the run continuation detector 103 line by line from top of the pattern in case a pattern of vertical touching characters is to be segregated in a same principle, the embodiment is described here along with segmentation of a pattern of lateral touching characters.

Together with the data of the character pattern, a width of the pattern (width between left end and right end of a continuity of touching black dots) and a number of patterns to be divided into, are input from another input port 110 and registered in the segmentation designator 106.

Figure 2:
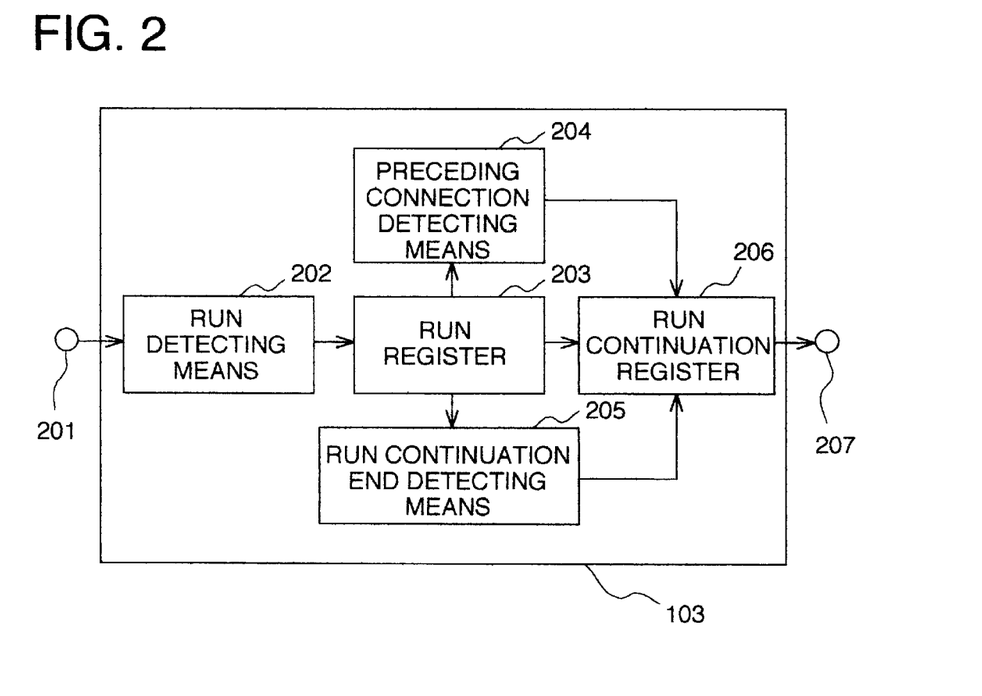
FIG. 2 is a block diagram illustrating a run continuation detector 103 of FIG. 1.

Referring to FIG. 2, the run continuation detector 103 is described, which includes an input terminal 201, a run detecting means 202, a run register 203, a preceding connection detecting means 204, a run continuation end detecting means 205, a run continuation register 206 and an output terminal 207.

The bit map data of a column read out of the image memory 102 are supplied to the run detecting means 202 through the input terminal 201, where each pixel data are checked in order from an end of the column. When at least two successive black pixels are found, the succession of the black pixels is defined as a 'run'. The run detecting means 202 sends a run data set of three values (x, y1, y2), for example, representing coordinates (x, y1) and (x, y2) of both ends of the 'run' detected. They may be values (x, y1, y2−y1) or the coordinates themselves, but will be expressed as (x, y1, y2) in the following paragraphs.

Each time when a run data set is registered in the run register 203, the preceding connection detecting means 204 verifies if there, in the preceding column, is a 'run' touching with the newcomer 'run'.

Representing an ensemble of N 'run's in a preceding column by (x−1, y1(i), y2(i)), a newcomer 'run' (x, y1, y2) is defined as touched when a 'run' exists in the ensamble which makes one of following conditional expressions true;

$y1 \leq y1(i)$ AND $y2 \geq y2(i)$, $y1 \geq y1(i)$ AND $y2 \leq y2(i)$, $y1 \leq y1(i) \leq y2$ or $y1 \leq y2(i) \leq y2$, where i=1, 2, . . . , N.

When a newcomer 'run' is touched with more than one preceding 'run' ('run' in a preceding column), the newcomer 'run' is defined and registered in the run continuation register 206 as a beginning 'run' of a run continuation, while each of said more than one preceding 'run' being registered as an ending 'run' of each run continuation respectively.

Similarly, a preceding 'run' touching with more than one newcomer 'run' is registered as an ending 'run' of a run continuation in the run continuation register 206, while each of the more than one newcomer 'run' registered as a beginning 'run' of each run continuation respectively.

A newcomer 'run' without any connection is also registered as a beginner of a new run continuation and a newcomer 'run' touched with only one preceding 'run' is registered as a member of the same run continuation to which the preceding 'run' is assigned.

After all run data sets in a column are verified, the run continuation end detecting means 205 is enabled for picking up 'run's touching with no newcomer 'run' in the preceding column and registering each of them as an ending 'run' of each run continuation in the run continuation register 206.

Then, all run data sets in the column are shifted in the preceding connection detecting means 204 for checking connections with 'run's in a succeeding column.

An ensemble of data of a run continuation registered in the run continuation register 206 are read out and sent to the peculiar run detector 104, where peculiar 'run's are selected as segmentation candidates to be reported to the segmentation candidate register 105.

Figure 3:
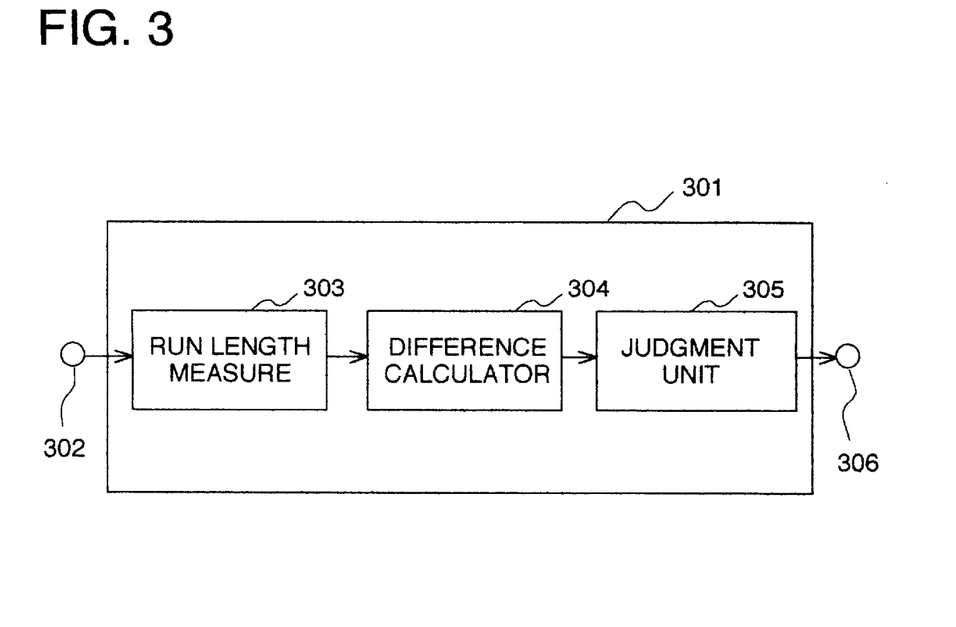
FIG. 3 is a block diagram of an embodiment 301 of a peculiar run detector 104 of FIG. 1.

Now, an embodiment 310 of the peculiar run detector 104 is described referring to FIG. 3.

Figure 4:
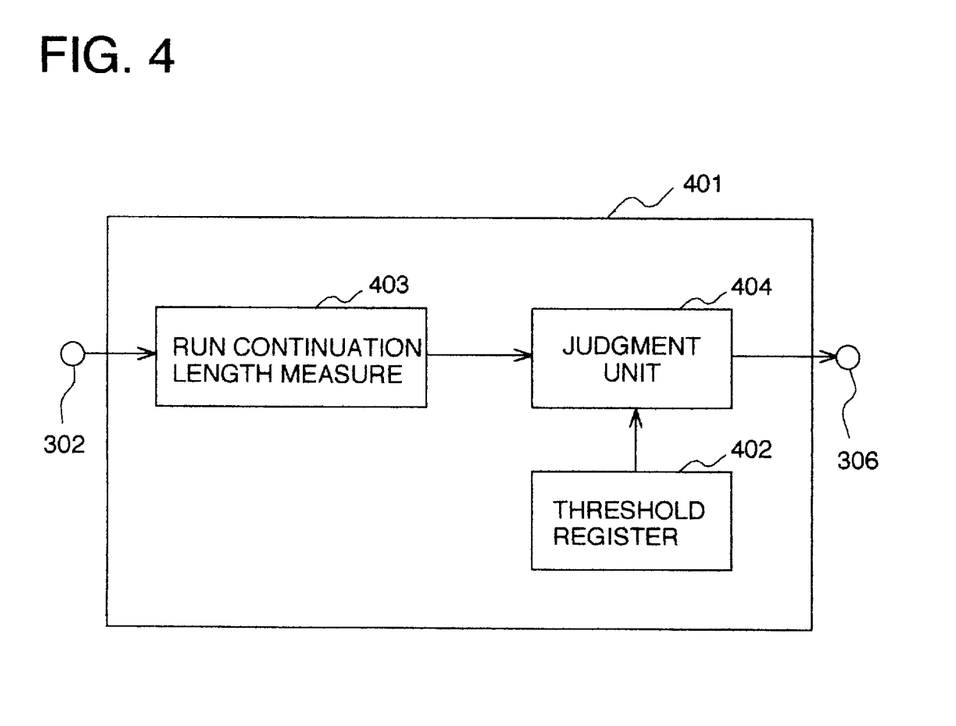
FIG. 4 is a block diagram of another embodiment 401 of the peculiar run detector 104 of FIG. 1.
Figure 5:
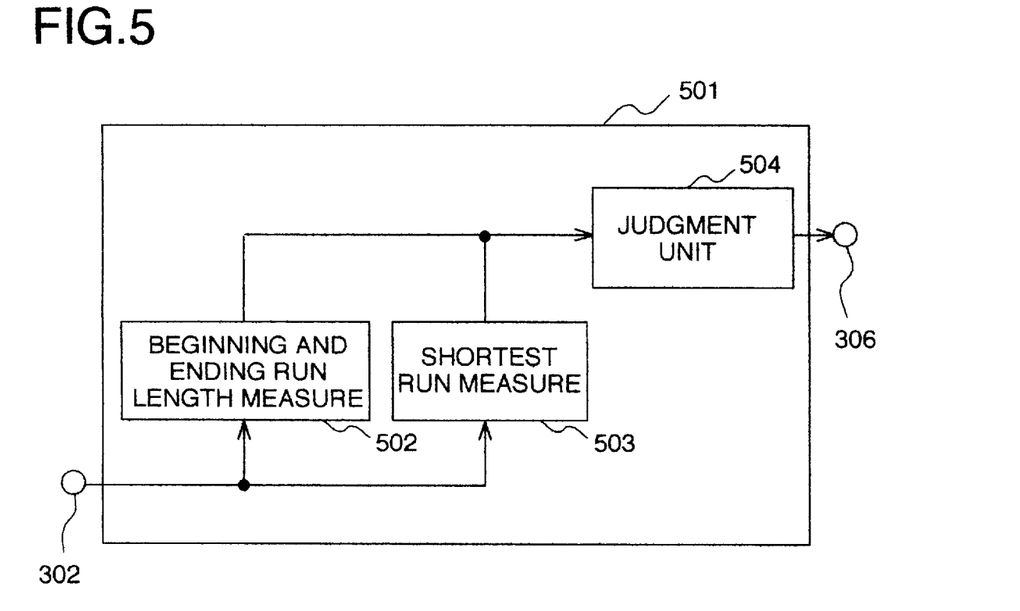
FIG. 5 is a block diagram of still another embodiment 501 of the peculiar run detector 104 of FIG. 1.
Figure 6:
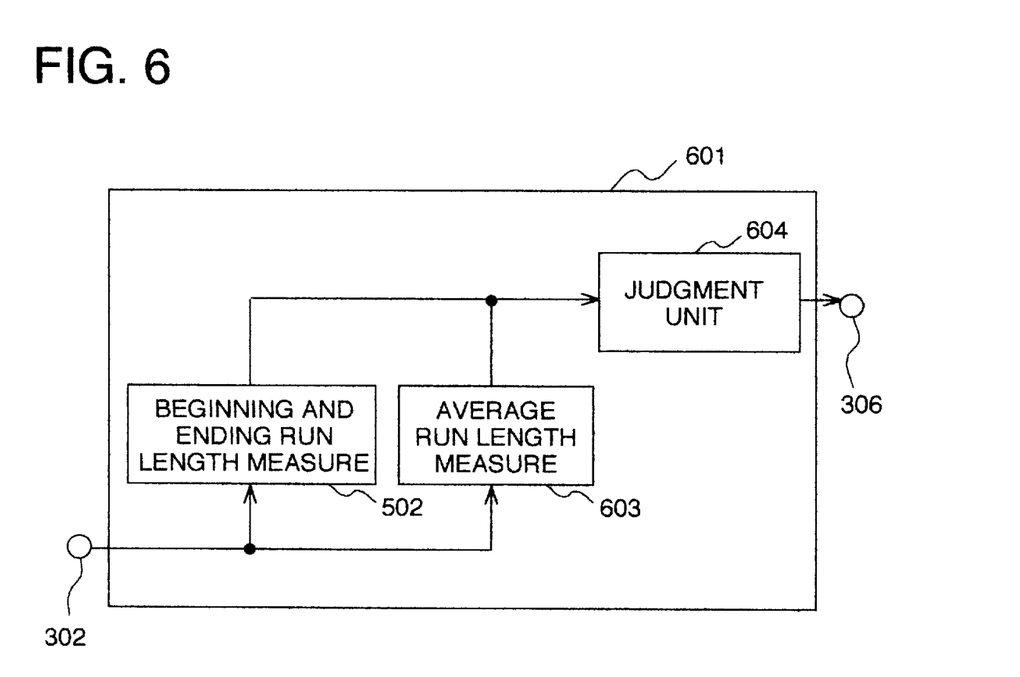
FIG. 6 is a block diagram of still another embodiment 601 of the peculiar run detector 104 of FIG. 1.

Here, it is noted that each of the embodiment 301 and other embodiment, shown in FIG. 4 to FIG. 6, described afterwards, may be applied to the peculiar run detector 104 individually or combined with certain of other embodiments by connecting terminals 302 and 306 of each embodiment with those of other embodiments respectively.

Figure 7:
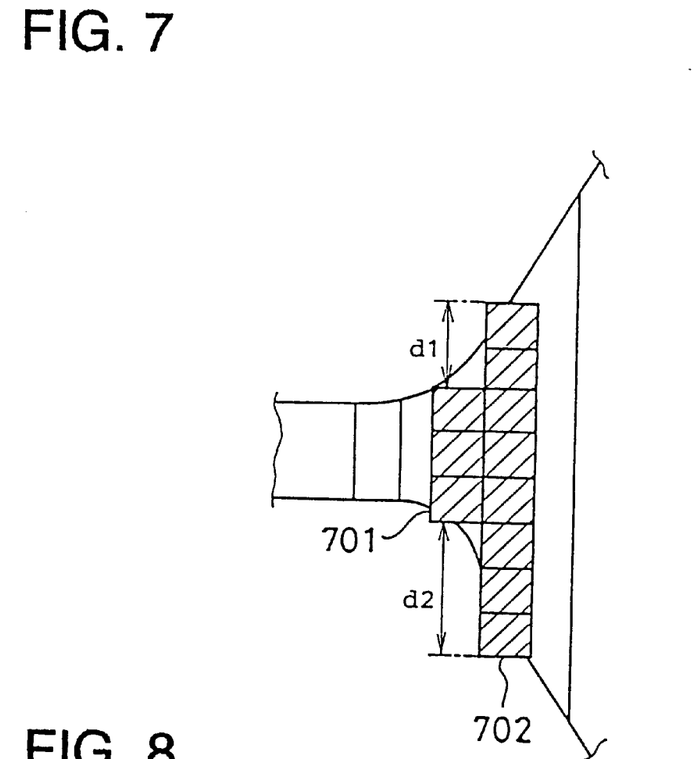
FIG. 7 shows an example of a character pattern wherein lengths of 'run's change sharply in a run continuation.

As illustrated in FIG. 3, the embodiment 301 of the peculiar run detector 104 comprises an input terminal 302, a run length measure 303, a difference calculator 304, a judgment unit 305 and an output terminal 306. FIG. 7 shows an example of a character pattern wherein lengths of 'run's change sharply in a run continuation. A numeral 701 indicates a preceding 'run' of a concerned 'run' 702.

Run data sets of each of run continuations read out from the run continuation detector 103 of FIG. 1 are input set by set to the run length measure 303 through the input terminal 302 for obtaining run lengths therefrom.

Each of the run lengths (y2−y1) is sent to the difference calculator 304 and a difference d from the preceding run length is calculated to be reported to the judgment unit 305, d being expressed as d=d1+d2 of FIG. 7 and hereafter called a run difference d.

Absolute value of the run difference d is compared with a predetermined threshold value d' in the judgment unit 305 and the 'run's having run difference d greater than d' are output from the output terminal 306, nominated for the segmentation candidates. The threshold value d' is assumed as a length of 2 pixels here, but it may be determined to any other suitable value considering magnification ratio of the input image data or thickness of written lines represented by run lengths.

In the embodiment 301, the run difference d is defined as the difference of length of a 'run' from length of the preceding 'run', that is, d=d1+d2 of FIG. 7 as described, but as a modification of the embodiment, a value d=|d1|+|d2|= |y1(i−1)−y1(i)|+|y2(i−1)−y2(i)| for example, a sum of absolute values of a beginning point difference and an end point difference between two consecutive 'run's, may be used as the run difference d to be compared with the threshold value d'.

Run data sets including x-coordinates of the segmentation candidates thus nominated and output from the output terminal 306 of the embodiment 301 are registered in the segmentation candidate register 105 of FIG. 1.

Figure 8:
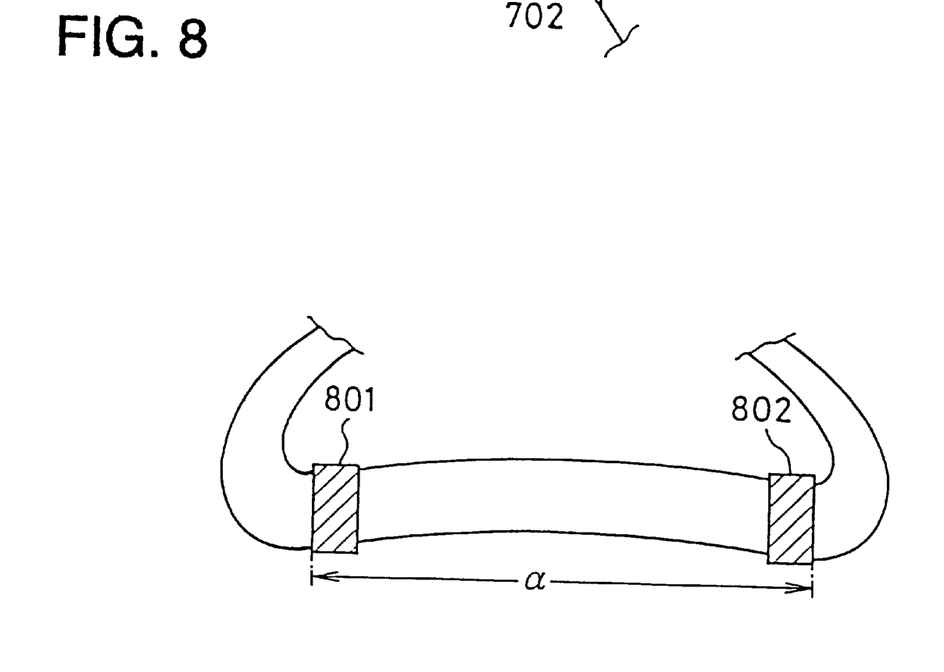
FIG. 8 illustrates an example of a character pattern wherein lateral line segments of two characters are connected composing a run continuation.

Now, another embodiment 401 of the peculiar run detector 104 of FIG. 1 is described, referring to FIG. 4 and FIG. 8.

The embodiment 401 shown in FIG. 4 comprises an input terminal 302, a run continuation length measure 403, a judgment unit 404, a threshold register 402 and an output terminal 306. FIG. 8 illustrates an example of a character pattern wherein lateral line segments of two characters are connected composing a run continuation. Numerals 801 and 802 indicate a beginning 'run' and an ending 'run' of the run continuation.

The run continuation length measure 403 calculates each run continuation width α for reporting to the judgment unit 404 from run data sets, that is from data of x-coordinates of beginning and ending 'run's 801 and 802, of each run continuation input through the input terminal 302.

The judgment unit 404 compares each run continuation width α to a predetermined threshold value α', and a central 'run' of each run continuation having a run continuation length α longer than the threshold value α' is nominated and output as a segmentation candidate from the output terminal 306.

The predetermined threshold value α' registered in the threshold register 402 is expressed as (β×W/M, W being width of the character pattern and M being temporary number of patterns to be divided into registered in the segmentation designator 106. In the embodiment, the coefficient β is determined to 1, but any other suitable value may be used.

As a modification of the embodiment 401 of FIG. 4, the judgment unit 404 may nominate and output a shortest 'run' or a 'run' of the largest run difference d of each run continuation wider than α' as a segmentation candidate from the output terminal 306, where the run difference d is the value defined in connection with the difference calculator 304 of FIG. 3.

As still another modification of the embodiment 401 of FIG. 4, the run continuation measure 403 may send a sum σ of each length of 'run's in the run continuation instead of the run continuation width α to the judgment unit 404, which nominates and outputs a central 'run', a shortest 'run' or a 'run' of the largest run difference d of each of the run continuations having the sum σ larger than a predetermined threshold value σ', as a segmentation candidate from the output terminal 306.

Figure 9:
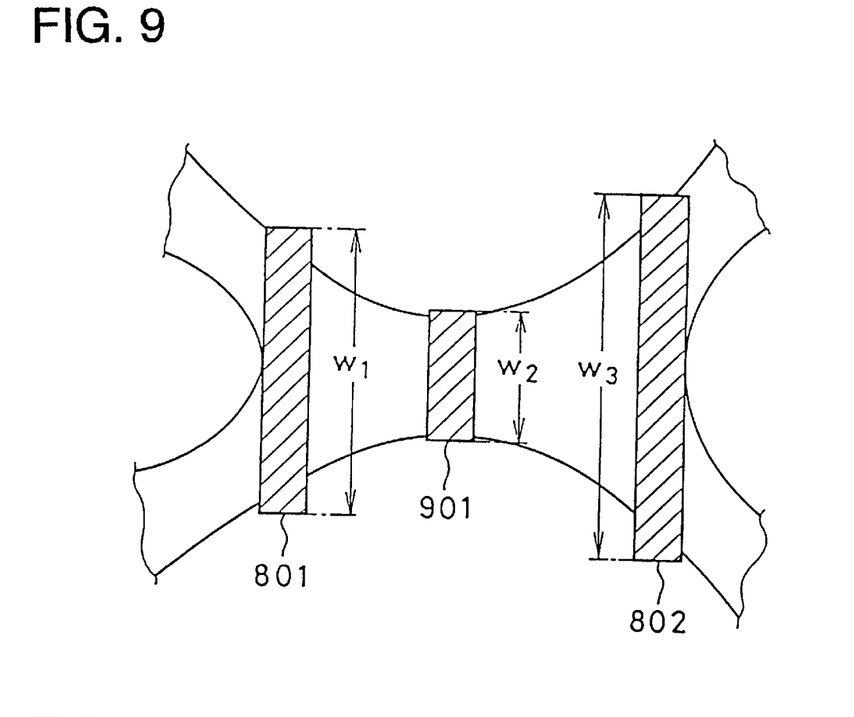
FIG. 9 illustrates a part of a character pattern wherein two bulges of two characters are touching with each other by way of a gangway.

Referring to FIG. 5 and FIG. 9, still another embodiment 501 of the peculiar run detector 104 of the invention is described. The embodiment 501 of FIG. 5 comprises an input terminal 302, a beginning and ending run length measure 502, a shortest run measure 503, a judgment unit 504 and an output terminal 306. In FIG. 9, a part of a character pattern is illustrated, wherein two bulges of two characters are touching with each other by way of a gangway. Numerals 801, 802 and 901 indicate a beginning 'run', an ending 'run' and a shortest 'run' respectively of a run continuation connecting the two bulges.

The beginning and ending run length measure 502 calculates lengths of the beginning 'run' w1=y2(0)−y1(0) and the ending 'run' w3=y2(k)−y1(k) as shown in FIG. 9 from run data sets of each run continuation input through the input terminal 302, k denoting the order of the ending 'run'. Also a shortest run length w2 of the run continuation is detected by the shortest run measure 503 and reported together with the lengths w1 and w3 to the judgment unit 504, where two values w1−w2 and w3−w2 are compared with a predetermined threshold value γ.

When the two values are both longer than the threshold value γ, the shortest 'run' 901 of FIG. 9 of the run continuation is nominated as a segmentation candidate and output from the output terminal 306.

In the embodiment 501, the threshold value γ is determined to two pixel length, but it may be any other suitable value. And the embodiment 501 may be modified to output the shortest 'run' as a segmentation candidate even when either of the two values w1−w2 or w3−w2 is longer than the threshold value γ.

Figure 10:
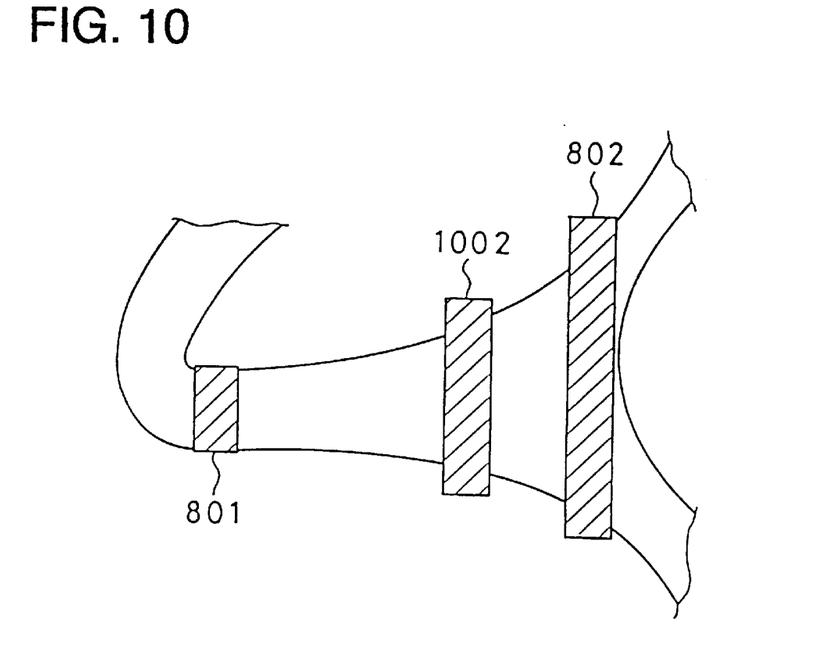
FIG. 10 illustrates a part of a character pattern wherein a lateral line segment of a character is touched with a bulge of another character.

Still another embodiment 601 of the peculiar run detector 104 of the invention is described referring to FIG. 6 and FIG. 10.

The embodiment 601 of FIG. 6 comprises an input terminal 302, a beginning and ending run length measure 502, an average run length measure 603, a judgment unit 604 and an output terminal 306. FIG. 10 illustrates a part of a character pattern wherein a lateral line segment of a character is touched with a bulge of another character. Numerals 801, 802 and 1002 indicate a beginning 'run', an ending 'run' and an average 'run' respectively of the run continuation of the touching line segment, where the average 'run' means the first 'run' shorter than the average run length of the run continuation found by measuring one by one from a thicker end of the run continuation.

The average run length measure 603 calculates an average run length w' of each run continuation, which is reported to the judgment unit 604 together with the beginning run length w1 and the ending run length w3 calculated by the beginning and ending run length measure 502. The average 'run' found by measuring from right end when w1<w'<w3 or found by measuring from left end when w1>w'>w3 of each run continuation is nominated and output from the output terminal 306 as a segmentation candidate. Instead of the average 'run', the embodiment 601 may be modified to nominate and output a 'run' which divides width of its run continuation internally by a constant a/b when w1>w'>w3 or a 'run' dividing the width internally by b/a when w1<w'<w3, as a segmentation candidate.

Here, ½ is used as the constant a/b, but any other suitable value may be used.

Now, returning to FIG. 1, the segmentation candidate register 105, the segmentation designator 106, the character pattern segregator 107 and the segregated pattern buffer 108 are described.

In the segmentation candidate register 105, segmentation candidates, that is run data sets nominated and output from at least one of the embodiments 301, 401, 501 and 601 of the peculiar run detector 104, are registered. A list of ensemble of these segmentation candidates is hereafter called a first candidate list.

The segmentation designator 106 designates a segmentation candidate to be listed in a second candidate list referring to the width W of the character pattern and a temporary number M of patterns to be divided into, initial values of which are supplied through the input port 110.

In the following paragraphs, the character pattern segmentation is described to be performed from the left end to the right end of the character pattern, although it may be performed from the right end to the left end or from both ends to the center of the character pattern alternatively or simultaneously.

For the first time, an allowable range of a segmentation width is set. The allowable range is defined as from e×W/M to f×W/M, where e and f are set to 0.6 and 1.3 respectively in the embodiment but they may be set to any other suitable values.

Then, each of the segmentation candidates in the first candidate list having x-coordinates in the allowable range, set as above described, is read out by the segmentation designator 106 and sent to the character pattern segregator 107 from the segmentation candidate register 105, origin of the x-coordinates being set at the left end of the character pattern.

The character pattern segregator 107 reads out data of the character pattern stored in the image memory 102. Wiping out the 'run' of the segmentation candidate, the character pattern is checked if it is divided into two patterns, that is, into two continuity of touching black dots, and, when divided, if each width of the two continuity divided by the segmentation candidate is in the allowable range from e×W/M to f×W/M and in a range from W−f×W/M to W−e×W/M respectively. When the both widths are in their allowable ranges, the segmentation candidate is registered in the second candidate list as a preliminary elected segmentation.

Thus, every 'run' in the first candidate list in the segmentation candidate register 105 having its x-coordinates in the range is checked for completing the second candidate list.

A 'run' with x-coordinates nearest to the value W/M among the second candidate list is elected and sent out as a final segmentation candidate to the character pattern segregator 107, and data of the left pattern divided from the character pattern by omitting the 'run' of the final segmentation candidate are stored in the segregated pattern buffer 108.

The segmentation designator 106 may elect and send out a segmentation candidate which gives a width of the divided pattern having a nearest value to W/M as the final segmentation candidate.

When the temporally number M is more than 2, the data of the character pattern of the image memory 102 are revised with data of the right pattern divided from the character pattern by omitting the 'run' of the final segmentation candidate. And, the width W being revised into the width of the revised character pattern and the number M decreased by 1, the processes in the segmentation designator 106 and the character pattern segregator 107 are restarted.

In case M is 2, also the right pattern is sent to the segregated pattern buffer 108 and M is decreased to 1.

When M becomes 1 finally, each of the segregated patterns stored in the segregated pattern buffer 108 is output consecutively from the output port 109.

Thus a character pattern segmentation in the embodiment of the invention is accomplished.

If the second candidate list remains empty because there is no such segmentation candidate having x-coordinates in the range, segmentation from right end or an expansion of the range may be tried.

Figure 11:
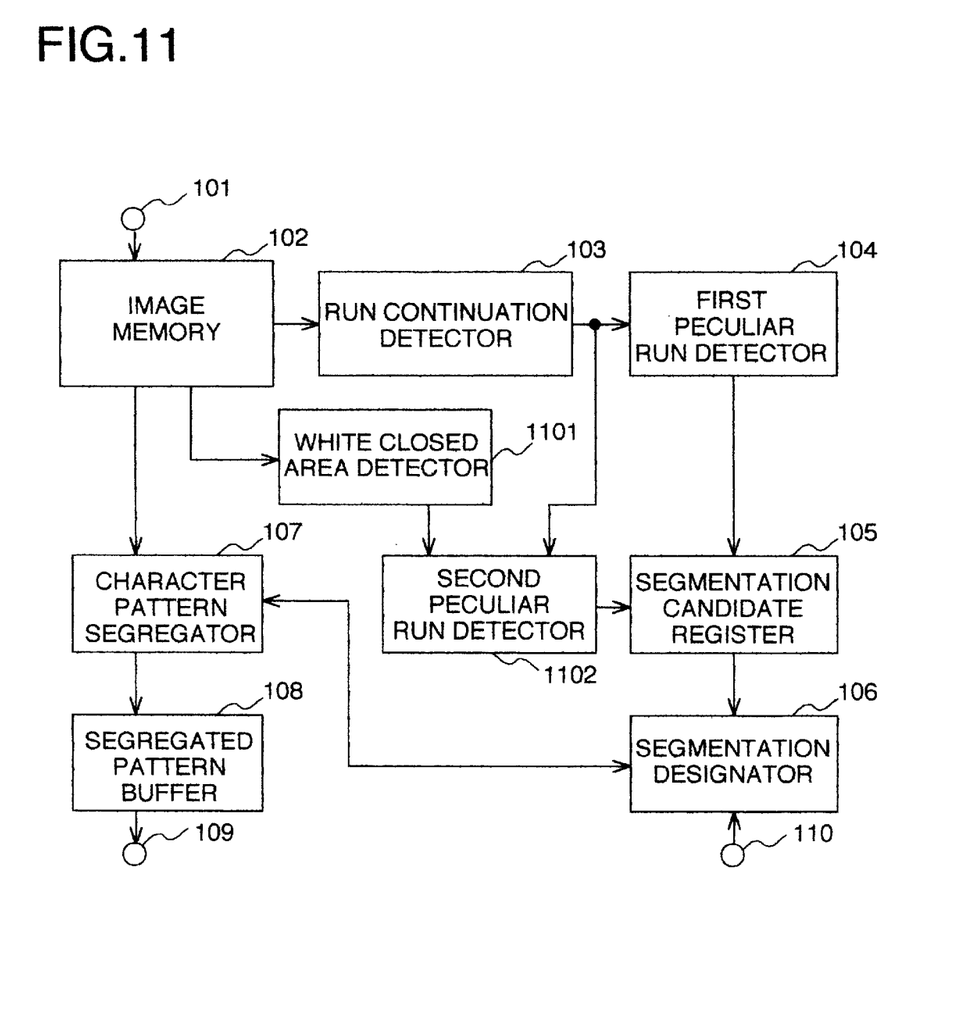
FIG. 11 is a block diagram of a second embodiment of the invention.

However, there may be characters touching at two points when the second candidate list is empty and a second embodiment illustrated in FIG. 11 of the invention should be applied in the case.

The second embodiment further comprises a white closed area detector 1101 and a second peculiar run detector 1102, and the image memory 102, the run continuation detector 103, the peculiar run detector 104, the segmentation candidate register 105, the segmentation designator 106, the character pattern segregator 107 and the segregated pattern register 108 described in connection with FIG. 1.

Until the preparation of the second candidate list, the run continuation detector 103, the peculiar run detector 104 (hereafter called the first peculiar run detector 104), the segmentation candidate register 105, the segmentation designator 106, the character pattern segregator 107 and the segregated pattern register 108 operate in the same way as those of the embodiment of FIG. 1 and so, duplicated descriptions are omitted.

When the second candidate list is still empty after all segmentation candidates in the first candidate list of a character pattern are checked, the white closed area detector 1101 and the second peculiar run detector 1102 are woken up on the assumption of two points touching.

In an embodiment of the white closed area detector 1101, the character pattern stored in the image memory 102 is read out and every white dot, or blank, touching with a black dot of the character pattern is traced 'right-hand-touching'.

That is to say, when a white dot neighboring a black dot is found, a virtual detector traces the black wall constructed with virtual cubic of black pixels with the right hand touching to the wall until he returns to the start point, and changes of advancing direction of the detector are accumulated, adding +90° by turning right and adding −90° by turning left to an angle accumulator. And when the accumulated angle changes are less than a negative threshold value, −200° for example, the traced black wall is defined to surround a white closed area.

In another embodiment of the white closed area detector 1101, a non-branching white closed area is detected in a similar way to detect a run continuation described in connection with the run continuation detector 103.

That is to say, every 'white run' composed of a succession of white dots in a column data of a character pattern being classified into white run continuations, isolated white run continuations, or white run continuations with neither of their beginning and ending 'white run's touching with any other white run continuation, are defined as non-branching white closed areas. Here, although branched white closed areas composed of more than one white run continuation are disregarded, it does not matter for the purpose of the embodiment, and so a non-branched white closed area is also generically called a white closed area in the following paragraphs.

Returning to FIG. 10, data of each white closed area thus detected, ensemble of coordinate data of traced black wall for example, are sent to the second peculiar run detector 1102, where the top and the bottom points of the white closed area being calculated, a 'run' touching the top point is sent to the segmentation candidate register 105, nominated from run data sets stored in the run continuation register 206 of FIG. 2, as a segmentation candidate to be listed in a third candidate list, while a 'run' touching the bottom point is sent as a segmentation candidate to be listed in a fourth candidate list.

Then, a top edge of the white closed area is calculated as a data set of white dot neighboring a black dot and having x-coordinates larger than xt−δ, where xt is the x-coordinates of the top point and δ is a predetermined positive threshold value. And, from the first candidate list of the segmentation candidates nominated by the first peculiar run detector 104, run data sets of segmentation candidates touching the top edge are also nominated to be listed in the third candidate list of the segmentation candidate register 105.

Similarly, from segmentation candidates listed in the first candidate list, run data sets of segmentation candidates touching a bottom edge of the white closed area are also listed in the fourth candidate list, where the bottom edge is composed of white dots neighboring black dots and having x-coordinates smaller than xb+δ, xb being x-coordinates of the bottom point.

In the embodiment, the threshold value δ is determined as a five dot length, but any other suitable value is applied.

Setting an allowable range of a segmentation width from e×W/M to f×W/M as same as described in connection with FIG. 1, the segmentation designator 106 selects and sends a combination of segmentation candidates in the allowable range, one from the third candidate list and one from the fourth candidate list to the character pattern segregator 107.

Here also, the segmentation designator 106 may determine and send out a combination which gives a width of the divided pattern having a nearest value to W/M as the finally selected combination of the segmentation candidates.

Figure 12:
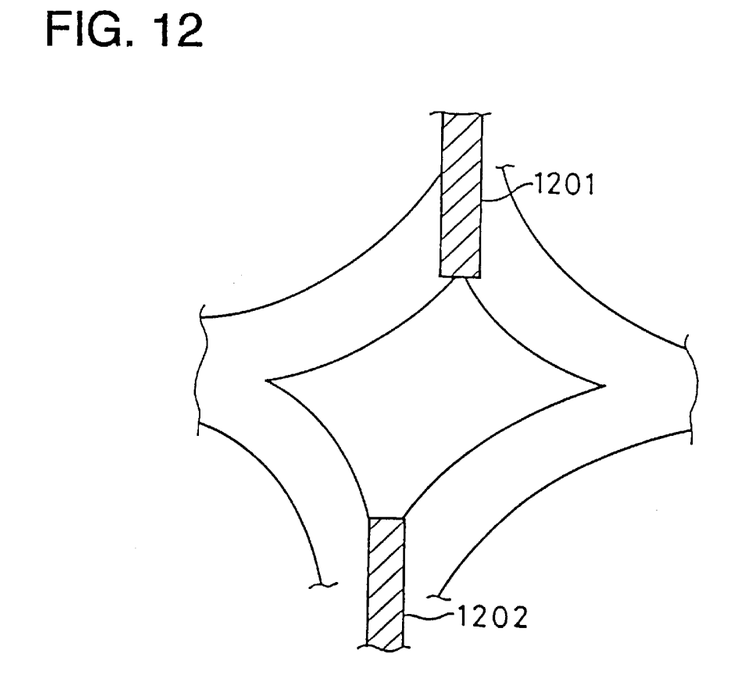
FIG. 12 illustrates an example of a white closed area surrounded by touching characters at their two bulges and an upper and a lower segmentation candidates.
Figure 13:
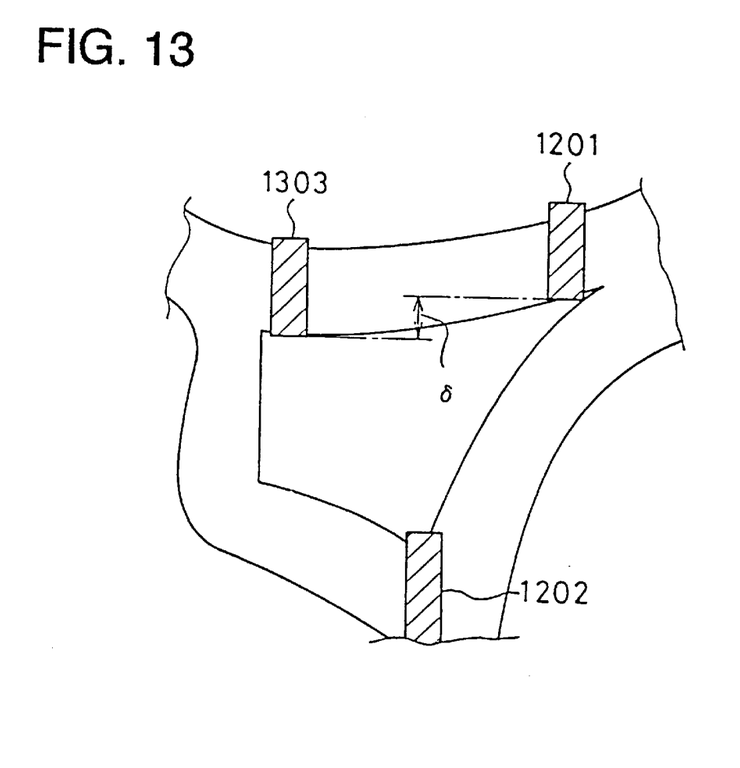
FIG. 13 illustrates an example of a white closed area surrounded by touching characters at their bulges and at a line and a bulge of each character.

FIG. 12 or 13 illustrates combinations of the segmentation candidates (1201, 1202) or (1303, 1202), where a numeral 1201 indicates a 'run' touching the top point, while a numeral 1202 indicating a 'run' touching the bottom point and a numeral 1303 indicating a 'run' touching the top edge of white closed areas surrounded by touching characters at their two bulges (FIG. 12) or at their bulges and at a lateral line segment of a character and a bulge of another character (FIG. 13).

The character pattern segregator 107 reads out data of the character pattern stored in the image memory 102. Wiping out the two 'run's of the combination, the character pattern is checked if it is divided into two patterns and, when divided, each width of the two continuities divided by the combination of the segmentation candidates is in the allowable range from e×W/M to f×W/M and in a range from W−f×W/M to W−e×W/M respectively. When the both widths are in their allowable ranges, the combination of the segmentation candidates is registered in the fifth candidate list as a preliminary elected combination.

After all combinations of the segmentation candidates in the allowable range of the third and the fourth candidate list are checked, a combination nominated in the fifth candidate list, of which the sum of absolute values of x-coordinate differences of both segmentation candidates is smallest, is determined and sent out as a finally selected combination of the segmentation candidates to the character pattern segregator 107.

If the fifth candidate list remains still empty in the second embodiment because there is no such combination of segmentation candidates having x-coordinates in the allowable range, segmentation from right end or an expansion of the allowable range may be tried in the second embodiment.

Thus, a character pattern segmentation in the second embodiment of the invention is accomplished and when the temporally number M is more than 2, the control of the embodiment returns to processes in the segmentation designator 106 and the character pattern segregator 107 and selection of segmentation candidates to be listed in the second candidate list is restarted for a revised character pattern, that is the remainining right pattern divided from the character pattern by omitting the 'run's of the finally selected combination.

The repetition is continued until M becomes 1 as described of the embodiment of FIG. 1 and repeated descriptions are omitted.

What is claimed is:

1. A character pattern segmentation system for dividing an original undivided pattern (P1) of a plurality of touching characters into an individual pattern (P2) representing one of the plurality of touching characters and a remainder pattern (P3) representing the remainder of the touching characters, according to a total width (W) of the plurality of touching characters and a total number (M) of said touching characters, comprising:

an image memory storing bit map data of said pattern, wherein said bit map data has a plurality of columns perpendicular to a plurality of rows;

a run continuation detector having, (a) run detecting means for reading out a current column from the plurality of columns, for determining when at least one run exists in said current column, and for registering said at least one run in a run register, (b) preceding connection detecting means for classifying each of said at least one run as one of a BEGINNING run, an ENDING run, and a CONTINUING run, by comparing said current column with a preceding column, (c) run continuation end detecting means for classifying each run in a previous column as an ENDING run when said run in a previous column fails to touch any of said at least one run in said current column, and (d) a run continuation register for storing classification results from said preceding connection detecting means and said run continuation end detecting means and for compiling run data representing each run detected;

a peculiar run detector for nominating and outputting ones of said runs as segmentation candidates;

a segmentation candidate register for storing said segmentation candidates in a first list;

a segmentation designator for (a) registering said segmentation candidates in a second list according to an allowable range of segment width based on said total width and said total number, and (b) selecting a final segmentation candidate from said second list; and a character pattern segregator for
  (a) reading said bit map data of said undivided pattern (P1) from the image memory,
  (b) selecting one by one each segmentation candidate from said first list,
  (c) outputting said segmentation candidate to said segmentation designator to be registered in said second list when said bit map data is divisible into two patterns if said segmentation candidate is deleted from said bit map data,
  (d) selecting said final segmentation candidate from said second list and erasing said final segmentation candidate from said bit map data so as to divide said plurality of touching characters into the individual pattern (P2) and the remainder pattern(P3).

2. A character pattern segmentation system as in claim 1, wherein said preceding connection detecting means performs the following classifications:

when said at least one run in the current column is touched by more than one run in the preceding column, said at least one run is classified as a BEGINNING run and each of said more than one run in said preceding column is classified as an ENDING run;

when said at least one run in the current column corresponds to more than one run and is touched by a single run in the preceding column, each of said more than one run is classified as a BEGINNING run and said single run in the preceding column is classified as an ENDING run;

when said at least one run in said current column is touched by no runs in a preceding column, said at least one run is classified as a BEGINNING run; and when one of said at least one run in said current column is touched by a single run in a preceding column, said at least one run is classified as a CONTINUING run.

3. A character pattern segmentation system as in claim 1, wherein said peculiar run detector nominates and outputs ones of said runs when a length of said ones of said runs is larger than a threshold length difference from a neighboring run.

4. A character pattern segmentation system as in claim 1, wherein said peculiar run detector nominates and outputs ones of said runs when a width of said ones of said runs is larger than a predetermined threshold.

5. A character pattern segmentation system as claimed in claim 4, wherein said peculiar run detector nominates and outputs one of said runs that further has a length difference from a neighboring run that is the greatest among all the runs in the run continuation with a width greater than the predetermined threshold.

6. A character pattern segmentation system as claimed in claim 4, wherein said peculiar run detector nominates and outputs one of said runs that additionally is a central run among all the runs in the run continuation with a width greater than the predetermined threshold.

7. A character pattern segmentation system as in claim 1, wherein said peculiar run detector nominates and outputs ones of said runs when a sum of lengths of said each run detected, is larger than a predetermined threshold.

8. A character pattern segmentation system as in claim 1, wherein said peculiar run detector nominates and outputs ones of said runs when either of two differences, w1–w2 and w3–w2 are larger than a predetermined threshold, wherein w1 is defined as a width of a BEGINNING run of said ones of said runs, w3 is defined as a width of an ENDING run of said ones of said runs, and w2 is defined as a width of a SHORTEST run of said ones of said runs.

9. A character pattern segmentation system as in claim 1, wherein said peculiar run detector nominates and outputs ones of said runs which are closest to w2 when the following inequality is true, w1<w2<w3, wherein w1 is defined as a width of a BEGINNING run of said ones of said runs, w3 is defined as a width of an ENDING run of said ones of said runs, and w2 is defined as an average width of all runs between w1 and w3.

10. A character pattern segmentation system as in claim 1, further comprising:

a white closed area detector for detecting a white closed area of said undivided pattern (P1); and a second peculiar run detector for nominating and outputting ones of said runs when said final segmentation candidate can not be designated, wherein said second peculiar run detector nominates and outputs from said first list:
  (a) ones of said runs as upper segmentation candidates, said runs being stored in said run continuation register, said runs that either touch a top point of said white closed area or touch a top edge of said white closed area being stored in said segmentation candidate register in a third list, and
  (b) ones of said runs as lower segmentation candidates, said runs being stored in said run continuation register, said runs that either touch a bottom point of said white closed area or touch a bottom edge of said white closed area being stored in said segmentation candidate register in a fourth list.

11. A character pattern segmentation system as in claim 10, wherein said top edge being an ensemble of white pixels neighboring a black pixel and having an x-coordinate difference smaller than a threshold value related to said top point, and said bottom edge being an ensemble of white pixels neighboring a black pixel having an x-coordinate difference smaller than a threshold value related to said bottom point.

12. A character pattern segmentation system as in claim 10, wherein said segmentation designator designates a final segmentation combination, wherein said final segmentation combination comprises one of said upper segmentation candidates from said third list and one of said lower segmentation candidates from said fourth list.

13. A character pattern segmentation system as claimed in claim 1, wherein said character pattern segregator repeatedly replaces the remainder pattern (P3) as the undivided pattern (P1) and repeats steps (a)–(d) until the original undivided pattern (P1) is divided into a plurality of individual patterns that correspond to the plurality of touching characters, respectively.

14. A character pattern segmentation system as claimed in claim 1, wherein said peculiar run detector nominates and outputs a run which divides a width of the run continuation by a predetermined fraction.

15. A character pattern segmentation system as claimed in claim 14, wherein said predetermined fraction is ½.

* * * * *